(12) United States Patent
Finn et al.

(10) Patent No.: US 8,281,240 B2
(45) Date of Patent: Oct. 2, 2012

(54) AVATAR AGGREGATION IN A VIRTUAL UNIVERSE

(75) Inventors: Peter G. Finn, Brampton (CA); Rick A. Hamilton, II, Charlottesville, VA (US); Clifford A. Pickover, Yorktown Heights, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 11/843,998

(22) Filed: Aug. 23, 2007

(65) Prior Publication Data

US 2009/0055754 A1 Feb. 26, 2009

(51) Int. Cl.
*G06F 3/048* (2006.01)

(52) U.S. Cl. .......................... 715/706; 715/750; 715/757

(58) Field of Classification Search ......................... None
See application file for complete search history.

(56) References Cited

U.S. PATENT DOCUMENTS

| | | | | |
|---|---|---|---|---|
| 7,350,149 B1 * | 3/2008 | Franceschelli et al. | ....... | 715/736 |
| 7,468,729 B1 * | 12/2008 | Levinson | ...................... | 345/473 |
| 7,840,903 B1 * | 11/2010 | Amidon et al. | ................ | 715/757 |
| 7,958,453 B1 * | 6/2011 | Taing | ............................. | 715/744 |
| 2005/0086605 A1 * | 4/2005 | Ferrer et al. | ................... | 715/745 |
| 2007/0050716 A1 * | 3/2007 | Leahy et al. | ................... | 715/706 |
| 2008/0146302 A1 * | 6/2008 | Olsen et al. | ....................... | 463/7 |
| 2008/0215973 A1 * | 9/2008 | Zalewski et al. | .............. | 715/706 |
| 2008/0215995 A1 * | 9/2008 | Wolf | ............................. | 715/758 |
| 2010/0018382 A1 * | 1/2010 | Feeney et al. | ................... | 84/615 |
| 2010/0070859 A1 * | 3/2010 | Shuster et al. | ................ | 715/706 |

OTHER PUBLICATIONS

Nguyen, "Creation and Distribution of Real-time Content: A Case Study in Provisioning Immersive Voice Communication to Networked Games," 2006, pp. 1-215, A Theses submitted in fulfillment of the requirements for the award of the degree, Doctor of Philosophy from the University of Wollongong, School of Electrical, Computer and Telecommunications Engineering.

\* cited by examiner

*Primary Examiner* — Doon Chow
*Assistant Examiner* — Anil Kumar
(74) *Attorney, Agent, or Firm* — Hoffman Warnick LLC; William E. Schiesser

(57) ABSTRACT

An approach that aggregates avatars that are online in a virtual universe into an aggregated avatar is described. In one embodiment, there is an avatar identification component configured to identify a plurality of avatars that are online in the virtual universe. An avatar aggregation component is configured to aggregate the plurality of avatars into an aggregated avatar representative of the plurality avatars.

29 Claims, 6 Drawing Sheets

US 8,281,240 B2

AVATAR AGGREGATION IN A VIRTUAL UNIVERSE

FIELD OF THE INVENTION

This disclosure relates generally to virtual universes, and more specifically to increasing performance of virtual universes by aggregating selected avatars that exist in these virtual universes into an aggregated avatar that is representative of the avatars.

BACKGROUND OF THE INVENTION

Virtual universes or virtual worlds are computer-based simulated environments intended for its users to inhabit and interact via avatars, which are personas or representations of the users of the virtual universes and generally take the form of two-dimensional or three-dimensional human or fantastical representations of a person's self. These types of virtual universes are now most common in massive multiplayer online games, such as Second Life which is a trademark of Linden Lab in the United States, other countries or both. Avatars in these types of virtual universes, which can number well over a million, have a wide range of business and social experiences.

As more and more avatars populate these virtual universes it becomes difficult for the servers that are responsible for managing the universes to perform at a satisfactory level. In particular, a server that is responsible for managing a particular region within a virtual universe will have a difficult time performing when there is a large quantity of avatars congregating in one area. For example, if there are 20 avatars trying to attend a virtual conference in a meeting center, then the server that manages this scene will have a difficult time trying to keep up with all of the interactions that will likely happen. In particular, the server has to determine information such as avatar information (e.g., the points that make up the avatar), location information (e.g., position where the meeting hall is within virtual universe, where the avatars are within the virtual region, etc.), scene information (e.g., data that makes up the scene) and send this information to a virtual universe client that resides in a computer that connects to the virtual universe through a communication network. The virtual universe client receives this information and renders all of this information on the computer so that the user can view and interact within the virtual universe. The more avatars that congregate in one area such as the 20 avatars attending the virtual conference, the more it will stress the server that manages that virtual region as well as the virtual universe client.

When the server and client are stressed, performance of the virtual universe is significantly degraded. Examples of degraded performance that result from having a large amount of avatars within a certain region of the virtual universe will include slow movements of avatars as they navigate the virtual universe, interactions with other avatars, and rendering of information on the virtual universe client. The more avatars that congregate in a given region will only further degrade performance of the virtual universe. As result, residents must restrict their numbers when congregating together in a virtual world in order to avoid performance degradation.

SUMMARY OF THE INVENTION

In one embodiment, there is a method for aggregating avatars that are online in a virtual universe. In this embodiment, the method comprises: identifying a plurality of avatars that are online in the virtual universe; and aggregating the plurality of avatars into an aggregated avatar representative of the plurality avatars.

In a second embodiment, there is an avatar aggregation tool for use in a virtual universe. In this embodiment, the tool comprises an avatar identification component configured to identify a plurality of avatars that are online in the virtual universe. An avatar aggregation component is configured to aggregate the plurality of avatars into an aggregated avatar representative of the plurality avatars.

In a third embodiment, there is a computer-readable medium storing computer instructions, which when executed, enables a computer system to aggregate avatars that are online in a virtual universe. In this embodiment, the computer instructions comprises identifying a plurality of avatars that are online in the virtual universe; and aggregating the plurality of avatars into an aggregated avatar representative of the plurality avatars.

In a fourth embodiment, there is a method for deploying an avatar aggregation tool for use in a computer system that aggregates avatars that are online in a virtual universe. In this embodiment, a computer infrastructure is provided and is operable to identify a plurality of avatars that are online in the virtual universe; and aggregate the plurality of avatars into an aggregated avatar representative of the plurality avatars.

DETAILED DESCRIPTION OF THE INVENTION

Embodiments of this disclosure are directed to a technique for keeping a group of avatars together in a virtual universe so that the group can navigate to locations within the universe and interact with each other without being subject to performance degradation that typically arises when large numbers of avatars try to interact or navigate within a certain region. The embodiments of this disclosure can overcome these performance degradation issues by aggregating avatars that exist in these virtual universes into an aggregate or composite avatar representative of a group or cluster of avatars.

Figure 1:
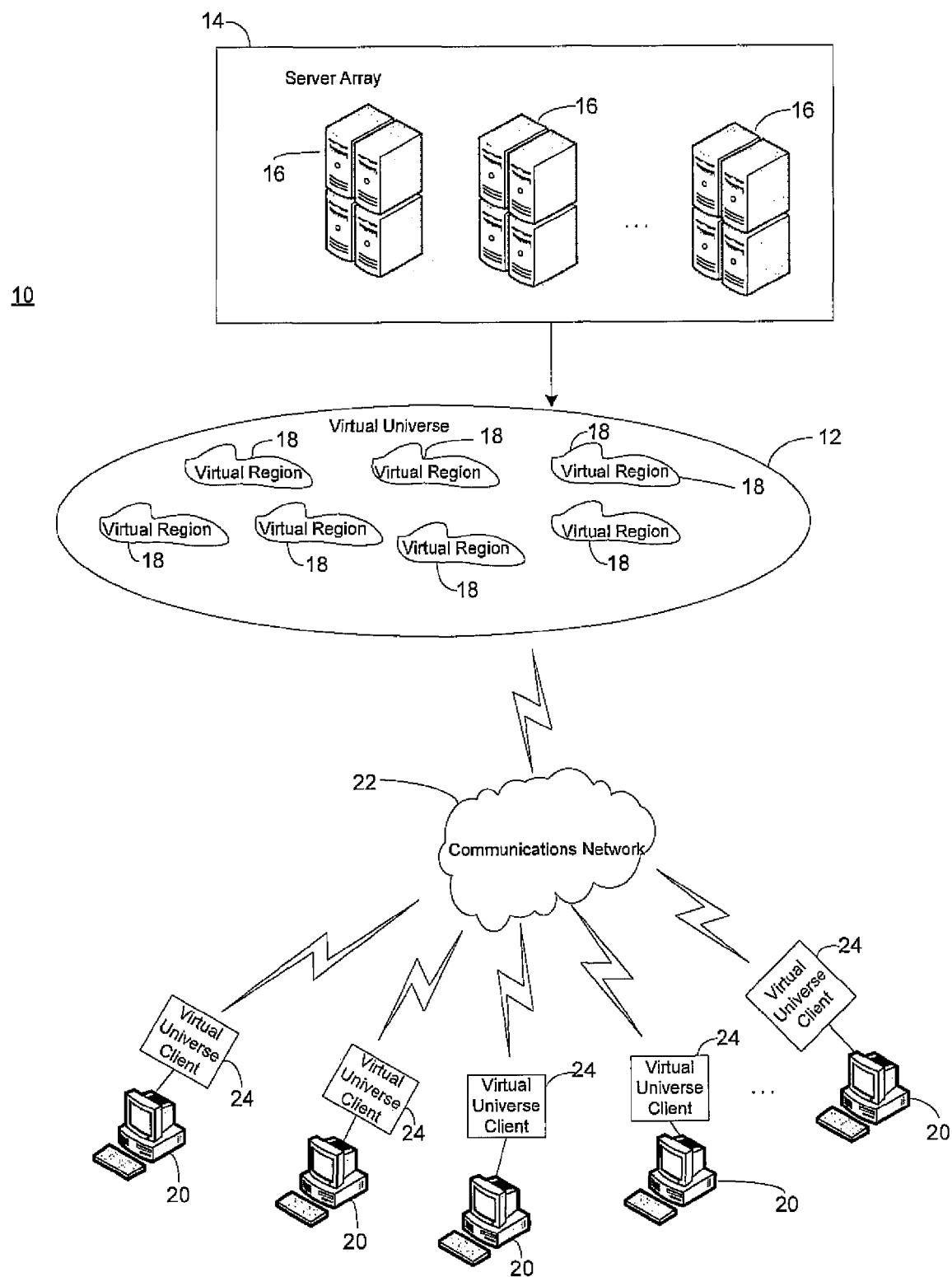
FIG. 1 shows a high-level schematic diagram showing a networking environment for providing a virtual universe according to one embodiment of this disclosure.

FIG. 1 shows a high-level schematic diagram showing a networking environment 10 for providing a virtual universe 12 according to one embodiment of this disclosure in which a service for aggregating avatars into an aggregated avatar can be utilized. As shown in FIG. 1, the networking environment 10 comprises a server array or grid 14 comprising a plurality of servers 16 each responsible for managing a portion of virtual real estate within the virtual universe 12. A virtual universe provided by a typical massive multiplayer online game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20 interact with the virtual universe 12 through a communication network 22 via a virtual universe client 24 that resides in the computer. Below are further details of the virtual universe 12, server array 14, and virtual universe client 24.

Figure 2:
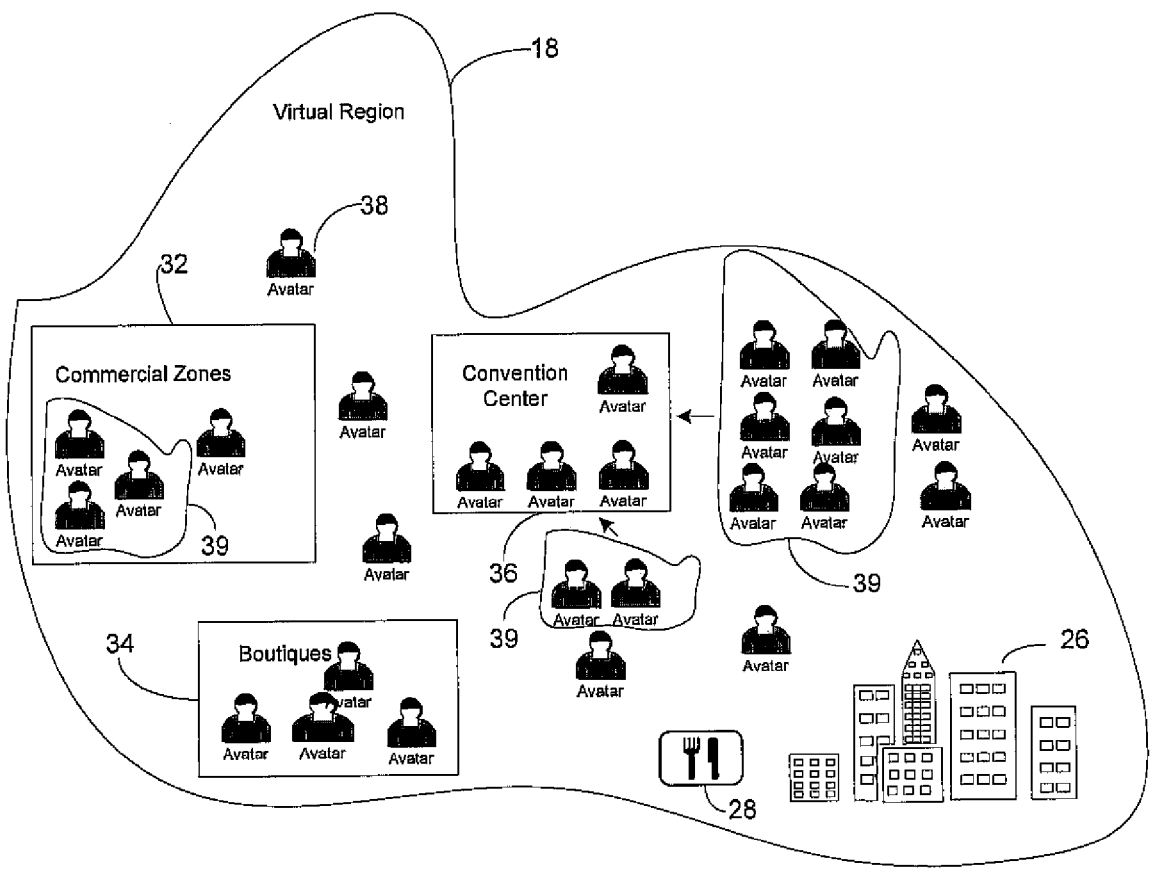
FIG. 2 shows a more detailed view of a virtual region shown in the virtual universe of FIG. 1 with aggregated avatars formed according to one embodiment of this disclosure.

FIG. 2 shows a more detailed view of what one virtual region 18 shown in the virtual universe 12 of FIG. 1 may comprise. As an example, the virtual region 18 shown in FIG. 2 comprises a downtown office center 26, restaurants 28 commercial zones 32 and boutiques 34 for shopping and a convention center 36 for meetings and various conventions. These examples of items in the virtual region 18 shown in FIG. 2 are only illustrative of some things that may be found in a virtual region and those skilled in the art will recognize that these regions can have many more items that can be found in a real-life universe as well as things that do not presently exist in real life.

Residents or avatars 38, which as mentioned above are personas or representations of the users of the virtual universe, roam all about the virtual region by walking, driving, flying or even by teleportation or transportation which is essentially moving through space from one point to another, more or less instantaneously. As shown in FIG. 2, some of the avatars have been aggregated into an aggregated avatar 39 that is a single avatar that is representative of the individual avatars that have been aggregated to form the single avatar. In another embodiment, the aggregated avatar 39 is a composite avatar that comprises each of the plurality of avatars bound together. For ease of illustration, FIG. 2 only shows the aggregated avatar 39 with an enclosure around the avatars that form the aggregated avatar. Those skilled in the art will recognize that the aggregated avatar could be represented by a master avatar that could be designed by a group leader or co-designed by all of the avatars in the aggregated avatar. In the embodiment where the aggregated avatar 39 comprises a plurality of avatars bound together, those skilled in the art will recognize that this representation may be a bulkier avatar wherein each of the individual avatars could be still recognizable but bound together or subsumed into one larger avatar.

Referring back to FIG. 2, there is an aggregated avatar 39 within commercial zone 32 and two other aggregated avatars 39 that are navigating towards the convention center 36 for attending a conference. Once these aggregated avatars 39 have been formed, avatars that form the aggregated avatars 39 can communicate among themselves without other avatars in the particular virtual region hearing or viewing their communication. Furthermore, these aggregated avatars 39 can teleport to other locations within the virtual universe. That is, the individual avatars that form the aggregated avatar 39 can teleport to another location. In one embodiment, the individual avatars that form the aggregated avatar can teleport one by one or in another embodiment the aggregated avatar 39 can teleport to the location in a manner where the teleportation of the individual avatars would be transparent to the users.

Below is a more detailed discussion on how the aggregated avatars are formed and unformed. In addition, there is a discussion on how the avatars within the aggregated avatars communicate with each other and teleport to other locations within the virtual universe.

Figure 3:
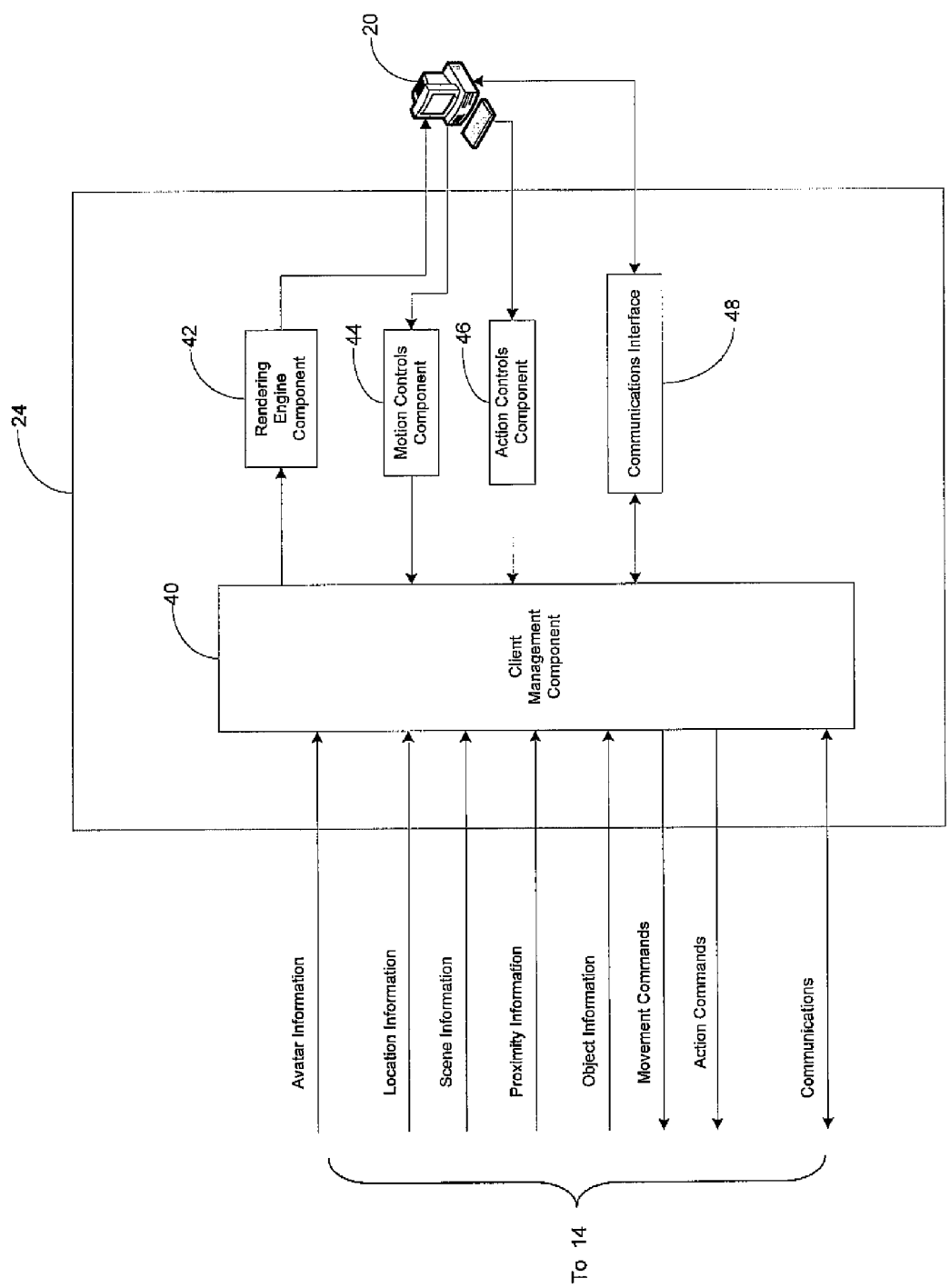
FIG. 3 shows a more detailed view of the virtual universe client shown in FIG. 1.

FIG. 3 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. In addition, the rendering engine 42 enables the user to visualize an aggregated avatar that may be formed in which his or her avatar is part of or represented thereby. A motion controls component 44 enables the user to make movements through the virtual universe. In one embodiment, movements through the virtual universe can include for example, gestures, postures, walking, running, driving, flying, etc. With regard to the aggregated avatar, the leader of the aggregated avatar may control its navigation or it may be controlled by a designated avatar within the aggregation that has the responsibility to control movements of the aggregated avatar.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed.

With regard to the aggregated avatar, group actions such as teleporting, navigating, determining an appearance, acquiring items to be placed within an aggregated avatar inventory or the inventory of an individual avatar inventory, and chatting or messaging may be performed. In one embodiment, the leader of the aggregated avatar performs these actions or they may be performed by a designated avatar or avatars that have the responsibility to perform these actions for the aggregated avatar. In another embodiment, neither a group avatar leader nor a designated avatar or avatars is required but rather the group actions represent an intent derived from an analysis of individual avatars' intents. For example, if 90% of the avatars in the aggregated avatar express a desire to travel north, and 10% express a desire to travel south, the aggregated avatar will travel north because this represents a majority intent or desire. The results of such group intent may also apply to determining the appearance of the group avatar, the location to teleport to, and the acquiring of items. For example, if the group avatar represents a company that is considering making a purchase of an item, the item may be purchased after an analysis of the desires of the avatars that compose the group avatar.

A communications interface 48 enables a user to communicate with other users of the virtual universe 12 through modalities such as chatting, instant messaging, gesturing, talking and electronic mail (e-mail). In addition, the communications interface 48 enables the avatars that form the aggregated avatar to communicate with each other. In this embodiment, the individual avatars that are represented in this blended or composite avatar can communicate with each other by chatting, instant messaging, gesturing, talking and e-mailing. In one embodiment, the avatars within the aggregated avatar can communicate with each other such that other residents within the virtual universe that may be at the same virtual region or within the same proximity of the aggregated avatar cannot read, hear, interpret or understand what is being communicated. In another embodiment, certain members of the aggregated avatar may be able to communicate with a select group within the aggregated avatar such that other members within the aggregated avatar cannot read, hear, interpret or understand what is being communicated.

FIG. 3 shows the various information that may be received by the client management component 40 from the virtual universe through the server array 14. In particular, the client management component 40 receives avatar information about the avatars that are in proximity to the user's avatar. Other avatar information that may be sent to the client management component 40 includes information that pertains to the aggregated avatar such as movements, actions performed by the members within the aggregated avatar.

In addition, the client management component 40 receives location information about the area that the user's avatar is near (e.g., what region or island he or she is in) as well as scene information (e.g., what the avatar sees). The location information can also include information that pertains to the location of the aggregated avatar (e.g., where the aggregated avatar is and what is being seen). The client management component 40 also receives proximity information which contains information on what the user's avatar is near and object information which is information that can be obtained by one's senses (e.g., touch, taste, smell, etc.,) and what actions are possible for nearby objects (e.g., postures, movements, etc.). The proximity information and object information can also include information on what the aggregated avatar is near and information that can be obtained by a group's senses.

FIG. 3 also shows the movement commands and action commands that are generated by the user that are sent to the server array via the client management component 40, as well as the communications that can be sent to the users of other avatars within the virtual universe. In the embodiment of the aggregated avatar, the movement and action commands would include movement and actions provided by the group leader of the aggregated avatar or the designated avatar or avatars within the composite or blended group that are responsible for such actions.

Figure 4:
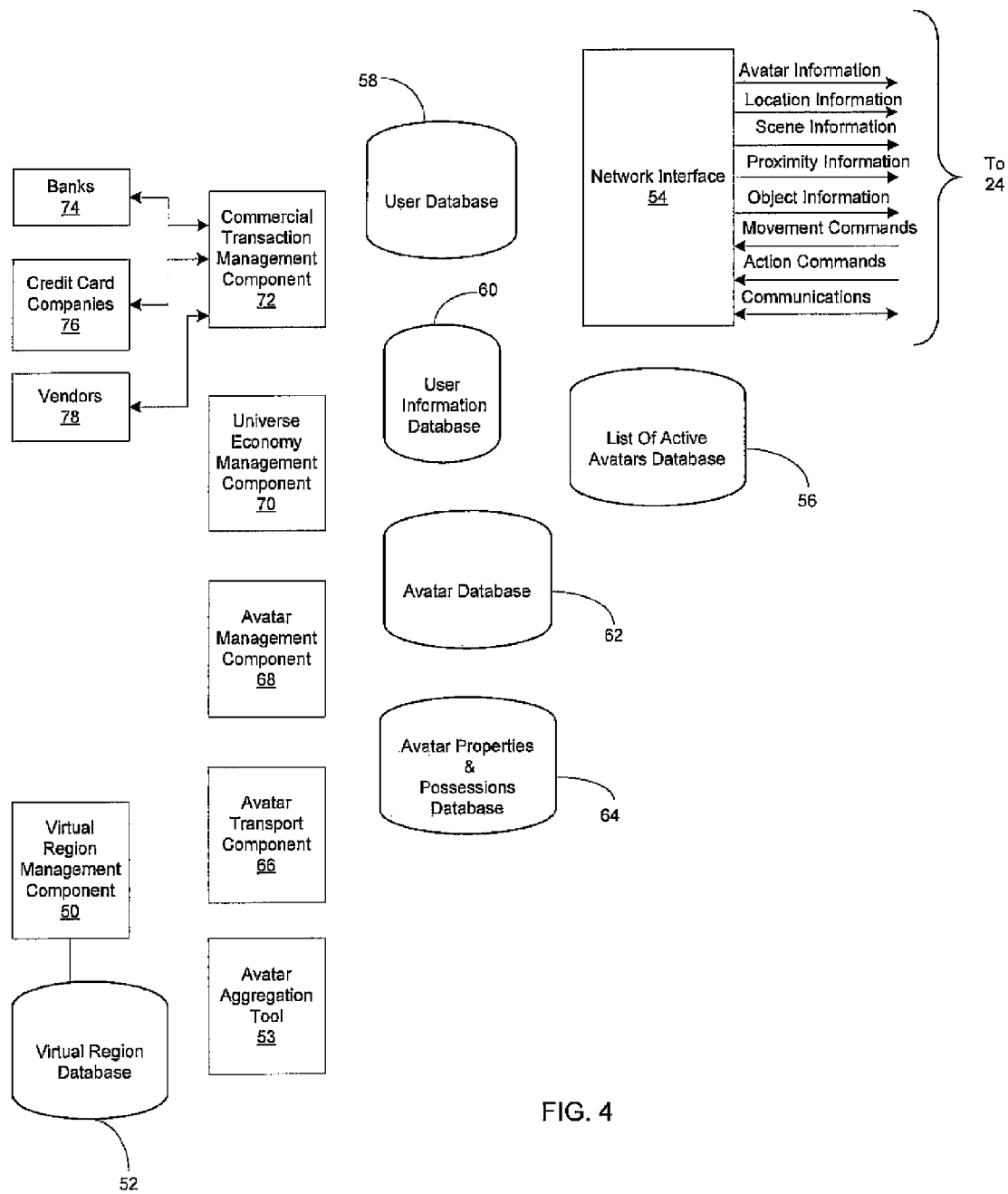
FIG. 4 shows a more detailed view of some the functionalities provided by the server array shown in FIG. 1.

FIG. 4 shows a more detailed view of some the functionalities provided by the server array 14 shown in FIG. 1. In particular, FIG. 4 shows a virtual region management component 50 that manages a virtual region within the virtual universe. In particular, the virtual region management component 50 manages what happens in a particular region such as the type of landscape in that region, the amount of homes, commercial zones, boutiques, streets, parks, restaurants, etc. For example, the virtual region management component 50 would allow the owner of a particular region or establishment within the region to specify requirements for entering or remaining within the region that could potentially affect certain avatar characteristics. In addition, the virtual region management component 50 would allow the owner of a particular region or establishment to provide a textual description that describes the area in more detail so that the avatar can ascertain if there will be a potential effect on their avatar characteristics. Those skilled in the art will recognize that the virtual region management component 50 can manage many other items within the virtual region.

A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

An avatar aggregation tool 53 aggregates, blends or combines selected avatars that are online into a single composite avatar representative of those avatars. Once the aggregated avatars have been formed, the avatar aggregation tool 53 has the capability to permit the avatars that form the aggregated avatars to communicate among themselves without other avatars in that particular virtual region hearing or viewing their communications. In addition, the avatar aggregation tool 53 has the capability to permit the aggregated avatars to teleport to other locations within the virtual universe. Below is a more detailed discussion of the avatar aggregation tool 53 and how it forms and unforms aggregated avatars, as well as a discussion on how the avatar aggregation tool 53 enables avatars within the aggregated avatars to communicate with each other and teleport to other locations within the virtual universe.

FIG. 4 shows a network interface 54 that enables the server array 14 to interact with the virtual universe client 24 residing on computer 20. In particular, the network interface 54 communicates information that includes information pertaining to aggregated avatars, location, scene, proximity and objects to the user through the virtual universe client 24 and receives movement and action commands as well as communications from the user via the universe client.

As shown in FIG. 4, there are several different databases for storing information. In particular, database 56 contains a list of all the avatars that are online in the virtual universe 12. In addition, database contains information on aggregated avatars such as the individual avatars that form the composite or blended avatar. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features) while database 64 contains an inventory listing properties and possessions that each avatar owns such as houses, cars, sporting equipment, appearance, attire, etc. Those skilled in the art will recognize that databases 58-64 may contain additional information if desired. Although the above information is shown in FIG. 4 as being stored in databases, those skilled in the art will recognize that other means of storing information can be utilized.

An avatar transport component 66 enables individual avatars and aggregated avatars to transport, which as mentioned above, allows avatars to transport through space from one point to another point, instantaneously. For example, avatars could go individually or as an aggregated avatar to a board meeting in another location within the virtual universe.

An avatar management component 68 keeps track of what online avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. For example, an aggregated avatar might want to buy blue blazers for its individual avatars that form the aggregated avatar to wear so that these avatars can dress similarly. In this case, the leader of the aggregate avatar or a designated avatar would make the purchase using the virtual universe currency to make the purchase. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 could be used to facilitate such a transaction.

Although not expressly shown in FIG. 4, all of the components shown in the figure are configured to interact with each other. The components that are shown as being interconnected are illustrated in that manner to convey the close interactions that exist between these components such as the banks 74, credit card companies 76, and vendors with the commercial transaction management component 72.

Figure 5:
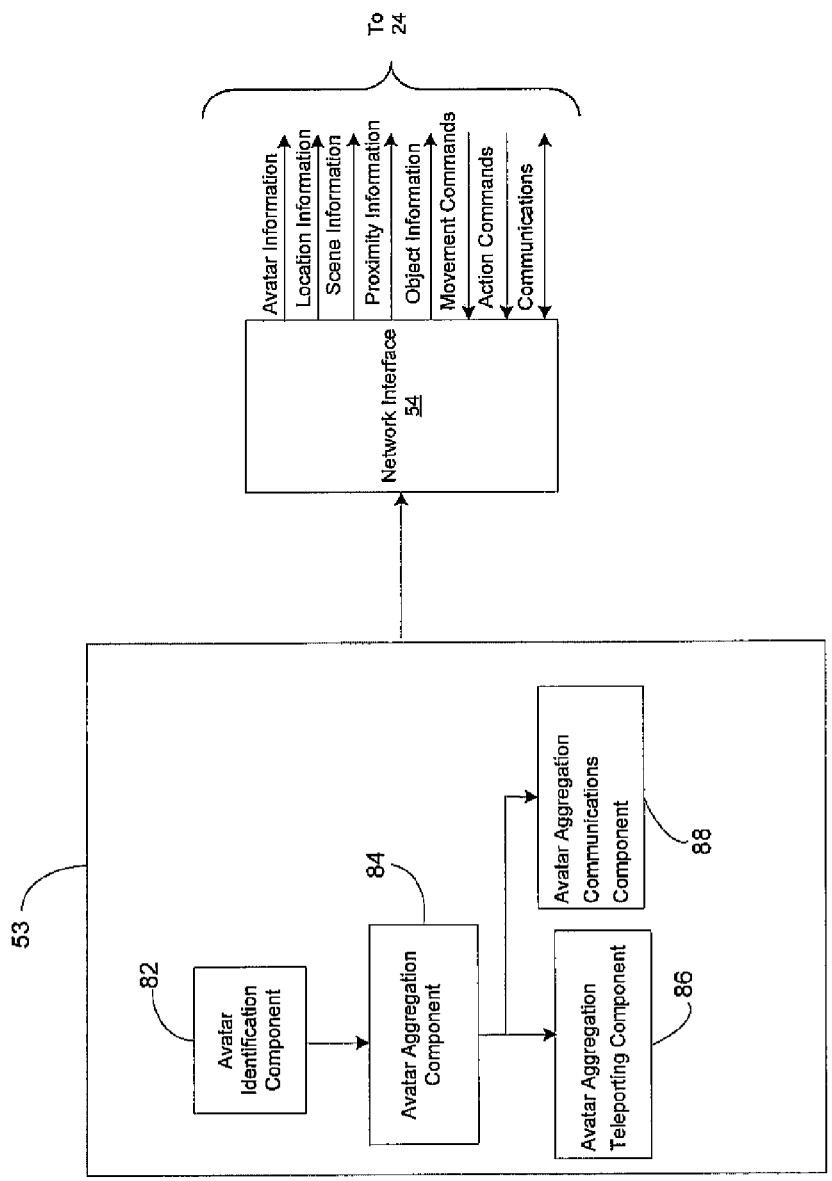
FIG. 5 shows a more detailed view of an avatar aggregation tool shown in FIG. 4 according to one embodiment of this disclosure.

FIG. 5 shows a more detailed view of the avatar aggregation tool 53 shown in FIG. 4 according to one embodiment of this disclosure. As mentioned above, the avatar aggregation tool 53 provides the capability to aggregate, blend or combine avatars into a single or composite avatar representative of a group or cluster of avatars. As shown in FIG. 5, in one embodiment, the avatar aggregation tool 53 resides on a computer system that is apart of the server array 14 and communicates directly to the virtual universe and its residents via the virtual universe client 24. In other embodiments, the avatar aggregation tool 53 might reside on the virtual universe client, or reside on separate computers in direct communication with the virtual universe servers 16 and universe clients 24.

The avatar aggregation tool 53 comprises an avatar identification component 82 that identifies avatars that are online in the virtual universe. An avatar aggregation component 84 is configured to aggregate selected avatars into an aggregated avatar. In one embodiment, the avatar aggregation component 84 is configured to aggregate avatars in response to receiving an indication that an avatar or avatars have expressed a desire for aggregation. A user's avatar can express a desire for aggregation by using right click actions through its mouse. Those skilled in the art will recognize that other techniques can be used to express a desire to aggregate avatars. For example, there may be an option in a pull-down menu that allows one to perform an aggregation or on-screen radial buttons may be used to perform the aggregation.

As an example, Avatar 1 can express a desire for aggregation by right clicking on a single second Avatar 2 or on an already-formed aggregate avatar. Avatar 2 or the already-formed aggregate will then receive the desired signal from Avatar 1. Avatar 2 or the already-formed aggregate will then give or deny permission to aggregate. If permission is granted, then the avatar aggregation component 84 will enable Avatar 1 to become aggregated with Avatar 2 or with the already formed group aggregated avatar. In one embodiment, if there is an overriding reason to prevent the aggregation from occurring, then the avatar aggregation component 84 can deny the aggregation despite the intention of the avatars.

The aggregation component 84 is also configured to unform the aggregated avatar and remove certain avatars from the aggregated avatar. In one embodiment, the avatar aggregation component 84 is configured to unform aggregate avatars or remove selected avatars from the aggregated avatar in response to receiving an indication of such a desire. A desire to unform an aggregate avatar or remove selected avatars from an aggregate can be expressed through different approaches that include using right click actions, pull-down menus and on-screen radial buttons. This function could be shown in these approaches as a disaggregation function; however, those skilled in the art will recognize that other naming conventions could be used.

As an example disaggregation, a single avatar or a group of avatars can express a desire to leave an aggregate of which they are currently a part of by clicking on a disaggregation function. The aggregated avatar receives a signal expressing desire for disaggregation from the single avatar or from a group of avatars bound to the aggregate (this could done through a vote of all avatar members in the aggregate or through a designated leader of the aggregate). If permission is granted for disaggregation, then the avatar aggregation component 84 allows the single avatar or group of avatars to leave the aggregate. In one embodiment, if a group of avatars expressed a desire to leave as a single unit, then the avatar aggregation component 84 can re-instantiate them as a new smaller aggregate outside the original aggregate. In one embodiment, if there is an overriding reason to prevent the disaggregation from occurring at that particular time (e.g., a meeting is not officially over so avatars are not free to leave), then the avatar aggregation component 84 can deny the disaggregation despite the intention of the avatars.

FIG. 5 shows that the avatar aggregation tool 53 further comprises an avatar aggregation teleporting component 86 that is configured to allow aggregated avatars to teleport to other regions within the virtual universe. An aggregate's avatar can express a desire for teleporting through different approaches that include voting or polling avatars that form the aggregate or having a designated leader making decisions regarding teleporting. Those skilled in the art will recognize that other approaches could be used to decide whether to teleport. The avatar aggregation teleporting component 86 receives the signal expressing the desire to teleport. As mentioned above, in one embodiment, the avatar aggregation teleporting component 86 can teleport individual avatars within the aggregate one by one or in a manner that teleports the aggregated avatar as a whole. Once the teleporting has occurred, then the avatar aggregation teleporting component 86 will reassemble the aggregated avatar at the new location.

The avatar aggregation tool 53 also comprises an avatar aggregation communications component 88 that is configured to permit selected avatars within the aggregated avatar to communicate with each other, without others within and outside the aggregated avatar from viewing such communications. A desire to communicate with other avatars within the aggregate can be expressed through different approaches that include using right click actions, pull-down menus and on-screen radial buttons. This function could be shown in these approaches as a communication function and cover different forms of communications such as chatting, instant messaging, gesturing, talking and e-mailing. As an example, Avatar 1 could right click on one or more Target avatars within an aggregate that he or she would like to chat with. The Target avatars may accept or deny the chat signal. If the Target avatars accept, then the avatar aggregation communications component 88 enables the avatars to chat among themselves with or without other avatars viewing their chats.

In another embodiment of this disclosure, the avatar aggregation tool 53 is used as a service to charge fees for each aggregation formed. In this embodiment, the provider of the virtual universe or a third party service provider could offer this avatar aggregation tool as a service by performing the functionalities described herein on a subscription and/or fee basis. In this case, the provider of the virtual universe or the third party service provider can create, deploy, maintain, support, etc., the avatar aggregation tool 53 that performs the processes described in the disclosure. In return, the virtual universe or the third party service provider can receive payment from the virtual universe residents via the universe economy management component 70 and the commercial transaction management component 72.

In still another embodiment, the methodologies disclosed herein can be used within a computer system to aggregate avatars that are online in a virtual universe. In this case, the avatar aggregation tool 53 can be provided and one or more systems for performing the processes described in the disclosure can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the disclosure.

Figure 6:
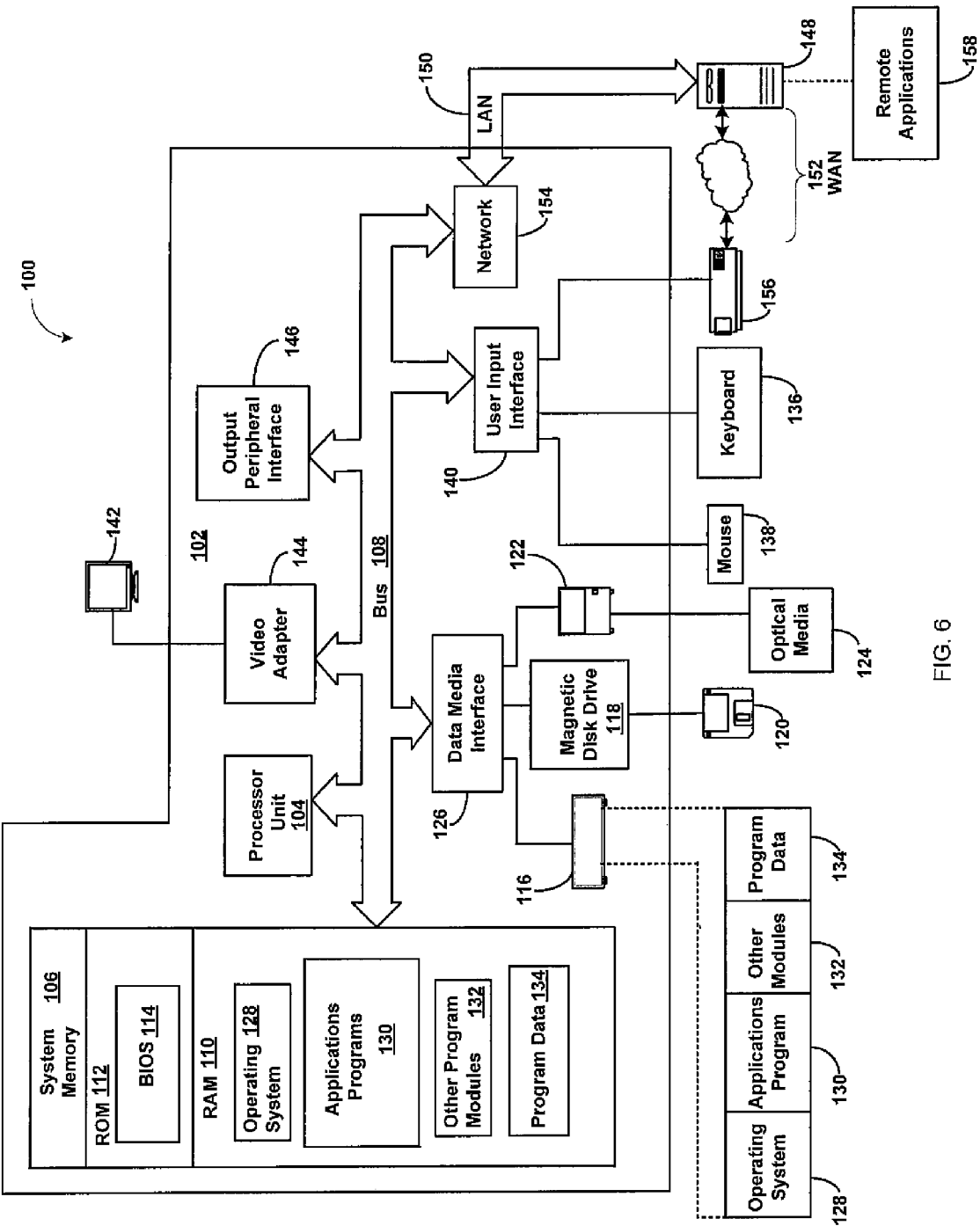
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 6.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 6, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the networking environment 10 of FIG. 1 including the server array 14, the virtual universe client 24 and the avatar aggregation tool 53.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure an approach for avatar aggregation in a virtual universe. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, performed on a computer system, for aggregating avatars that are online in a virtual universe, the method comprising:

using the computer system to perform the following:

identifying a plurality of avatars that are online in the virtual universe;

aggregating the plurality of avatars into an aggregated avatar representative of the plurality avatars that enables the avatars to keep together while navigating to locations in the virtual universe and interact with each other without being subject to performance degradation of the virtual universe, wherein the aggregated avatar is a composite avatar that comprises each of the plurality of avatars bound together, wherein individual visible characteristics associated with each avatar of the plurality of bound avatars that form the aggregated avatar is visibly discernible to other avatars that are online in the virtual universe; and enabling the aggregated avatar to have decision making capabilities for the plurality of avatars that comprise the aggregated avatar, wherein decisions are made by at least one of a designated avatar that has been designated by the plurality of avatars to make decisions on behalf of the aggregated avatar, a vote taken from the plurality of avatars that is representative of a decision made by the aggregated avatar or through group actions derived from an intent analysis of the plurality of avatars, wherein the intent analysis comprises determining a percentage of the plurality of avatars that have a common desire to do a certain action, and selecting the action that represents a majority of the plurality of avatars desire to do the certain action.

2. The method according to claim 1, wherein the aggregated avatar is a single composite avatar.

3. The method according to claim 1, further comprising receiving an indication that the identified plurality of avatars have expressed a desire for aggregation.

4. The method according to claim 3, further comprising determining whether to grant permission for aggregating the plurality of avatars into the aggregated avatar.

5. The method according to claim 1, further comprising removing an avatar from the aggregated avatar.

6. The method according to claim 5, further comprising receiving an indication that the avatar desired to be removed from the aggregated avatar.

7. The method according to claim 1, further comprising removing a group of avatars from the aggregated avatar.

8. The method according to claim 1, further comprising permitting selected avatars within the aggregated avatar to communicate with each other, without other avatars within and outside the aggregated avatar from viewing communications.

9. The method according to claim 1, further comprising teleporting the aggregated avatar to another region within the virtual universe.

10. A computer system for use in a virtual universe, comprising:
   at least one processor;
   memory operably associated with the at least one processing unit; and
   an avatar aggregation tool for use in a virtual universe that is storable in memory and executable by the at least one processing unit, the avatar aggregation tool comprising:
   an avatar identification component configured to identify a plurality of avatars that are online in the virtual universe; and
   an avatar aggregation component configured to aggregate the plurality of avatars into an aggregated avatar representative of the plurality avatars that enables the avatars to keep together while navigating to locations in the virtual universe and interact with each other without being subject to performance degradation of the virtual universe, wherein the aggregated avatar is a composite avatar that comprises each of the plurality of avatars bound together, wherein individual visible characteristics associated with each avatar of the plurality of bound avatars that form the aggregated avatar is visibly discernible to other avatars that are online in the virtual universe, wherein the avatar aggregated component is further configured to enable the aggregated avatar to have decision making capabilities for the plurality of avatars that comprise the aggregated avatar, wherein decisions are made by at least one of a designated avatar that has been designated by the plurality of avatars to make decisions on behalf of the aggregated avatar, a vote taken from the plurality of avatars that is representative of a decision made by the aggregated avatar or through group actions derived from an intent analysis of the plurality of avatars, wherein the intent analysis comprises determining a percentage of the plurality of avatars that have a common desire to do a certain action, and selecting the action that represents a majority of the plurality of avatars desire to do the certain action.

11. The computer system according to claim 10, wherein the aggregated avatar is a single composite avatar.

12. The computer system according to claim 10, wherein the avatar aggregation component is further configured to receive an indication that the identified plurality of avatars have expressed a desire for aggregation.

13. The computer system according to claim 12, wherein the avatar aggregation component is further configured to determine whether to grant permission for aggregating the plurality of avatars into the aggregated avatar.

14. The computer system according to claim 10, wherein the avatar aggregation component is further configured to remove an avatar from the aggregated avatar.

15. The computer system according to claim 14, wherein the avatar aggregation component is further configured to receive an indication that the avatar desired to be removed from the aggregated avatar.

16. The computer system according to claim 10, wherein the avatar aggregation component is further configured to remove a group of avatars from the aggregated avatar.

17. The computer system according to claim 10, further comprising an avatar aggregation communication component configured to permit selected avatars within the aggregated avatar to communicate with each other, without other avatars within and outside the aggregated avatar from viewing communications.

18. The computer system according to claim 10, further comprising an avatar aggregation teleporting component configured to teleport the aggregated avatar to another region within the virtual universe.

19. A computer-readable storage medium storing computer instructions, which when executed, enables a computer system to aggregate avatars that are online in a virtual universe, the computer instructions comprising:
   identifying a plurality of avatars that are online in the virtual universe;
   aggregating the plurality of avatars into an aggregated avatar representative of the plurality avatars that enables the avatars to keep together while navigating to locations in the virtual universe and interact with each other without being subject to performance degradation of the virtual universe, wherein the aggregated avatar is a composite avatar that comprises each of the plurality of avatars bound together, wherein individual visible characteristics associated with each avatar of the plurality of bound avatars that form the aggregated avatar is visibly discernible to other avatars that are online in the virtual universe; and
   enabling the aggregated avatar to have decision making capabilities for the plurality of avatars that comprise the aggregated avatar, wherein decisions are made by at least one of a designated avatar that has been designated by the plurality of avatars to make decisions on behalf of the aggregated avatar, a vote taken from the plurality of avatars that is representative of a decision made by the aggregated avatar or through group actions derived from an intent analysis of the plurality of avatars, wherein the intent analysis comprises determining a percentage of the plurality of avatars that have a common desire to do a certain action, and selecting the action that represents a majority of the plurality of avatars desire to do the certain action.

20. The computer-readable storage medium according to claim 19, wherein the aggregated avatar is a single composite avatar.

21. The computer-readable storage medium according to claim 19, further comprising instructions for receiving an indication that the identified plurality of avatars have expressed a desire for aggregation.

22. The computer-readable storage medium according to claim 19, further comprising instructions for determining whether to grant permission for aggregating the plurality of avatars into the aggregated avatar.

23. The computer-readable storage medium according to claim 19, further comprising instructions for removing an avatar from the aggregated avatar.

24. The computer-readable storage medium according to claim 23, further comprising instructions for receiving an indication that the avatar desired to be removed from the aggregated avatar.

25. The computer-readable storage medium according to claim 19, further comprising instructions for removing a group of avatars from the aggregated avatar.

26. The computer-readable storage medium according to claim 19, further comprising instructions for permitting selected avatars within the aggregated avatar to communicate with each other, without other avatars within and outside the aggregated avatar from viewing communications.

27. The computer-readable storage medium according to claim 19, further comprising instructions for teleporting the aggregated avatar to another region within the virtual universe.

28. The computer-readable storage medium according to claim 19, further comprising instructions for charging a service fee for aggregating the plurality of avatars into the aggregated avatar.

29. A method for deploying an avatar aggregation tool for use in a computer system that aggregates avatars that are online in a virtual universe, comprising:

provoding a computer infrastructure operable to:

identify a plurality of avatars that are online in the virtual universe;

aggregate the plurality of avatars into an aggregated avatar representative of the plurality avatars that enables the avatars to keep together while navigating to locations in the virtual universe and interact with each other without being subject to performance degradation of the virtual universe, wherein the aggregated avatar is a composite avatar that comprises each of the plurality of avatars bound together, wherein individual visible characteristics associated with each avatar of the plurality of bound avatars that form the aggregated avatar is visibly discernible to other avatars that are online in the virtual universe; and enable the aggregated avatar to have decision making capabilities for the plurality of avatars that comprise the aggregated avatar, wherein decisions are made by at least one of a designated avatar that has been designated by the plurality of avatars to make decisions on behalf of the aggregated avatar, a vote taken from the plurality of avatars that is representative of a decision made by the aggregated avatar or through group actions derived from an intent analysis of the plurality of avatars, wherein the intent analysis comprises determining a percentage of the plurality of avatars that have a common desire to do a certain action, and selecting the action that represents a majority of the plurality of avatars desire to do the certain action.

* * * * *